US012725493B2

(12) United States Patent
Mattar et al.

(10) Patent No.: US 12,725,493 B2
(45) Date of Patent: Sep. 1, 2026

(54) PROVIDING OPTICAL AND RADIO FREQUENCY INFORMATION IN ETHERNET ADVANCED PHYSICAL LAYER BASED END POINT FIELD DEVICES

(71) Applicant: Schneider Electric Systems USA, Inc., Foxboro, MA (US)

(72) Inventors: Jeffrey Mattar, Foxboro, MA (US); Mark Bertolina, Foxboro, MA (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 190 days.

(21) Appl. No.: 18/377,646

(22) Filed: Oct. 6, 2023

(65) Prior Publication Data

US 2024/0119812 A1 Apr. 11, 2024

Related U.S. Application Data

(60) Provisional application No. 63/414,794, filed on Oct. 10, 2022.

(51) Int. Cl.
*G08B 5/36* (2006.01)

(52) U.S. Cl.
CPC .................................... *G08B 5/36* (2013.01)

(58) Field of Classification Search
CPC ....... G08B 5/36; H05K 7/1462; H05K 5/0017
USPC ...................................................... 174/50.52
See application file for complete search history.

(56) References Cited

U.S. PATENT DOCUMENTS

| | | | | |
|---|---|---|---|---|
| 5,617,296 | A | 4/1997 | Melville et al. | |
| 2011/0290521 | A1 | 12/2011 | Fargano | |
| 2024/0237235 | A1* | 7/2024 | Xue | H04M 1/0274 |

OTHER PUBLICATIONS

Extended Search Report for EP App. No. 23202490.1 dated Mar. 18, 2024, 8 pages.

* cited by examiner

*Primary Examiner* — Tremesha W Burns
(74) *Attorney, Agent, or Firm* — Patterson + Sheridan, LLP

(57) ABSTRACT

Systems/methods for providing Ethernet-APL based end point field devices employ a protective enclosure that allows optical and radio frequency signals to pass through with little or no diffraction or attenuation. The disclosed Ethernet-APL based end point field device is advantageously able to use visual status/configuration indicators as well as radio frequency modules that transmit and receive wireless communication during device operation. To achieve the above, the Ethernet-APL based end point field device herein is provided with a protective enclosure that is made partly or entirely of a transparent, electrically nonconductive material. Such an arrangement allows operators to observe unaided the visual status/configuration indicators of the end point field device, and also allows radio frequency signals to pass through the enclosures with negligible or no attenuation.

22 Claims, 11 Drawing Sheets

PROVIDING OPTICAL AND RADIO FREQUENCY INFORMATION IN ETHERNET ADVANCED PHYSICAL LAYER BASED END POINT FIELD DEVICES

CROSS-REFERENCE TO RELATED APPLICATIONS

This application claims the benefit of priority to and incorporates herein by reference U.S. Provisional Application No. 63/414,794, entitled "ENCLOSURE FOR ADVANCED PHYSICAL LAYER BASED END POINT FIELD DEVICE," filed Oct. 10, 2022.

FIELD

The present disclosure relates generally to field devices, and more particularly to Ethernet Advanced Physical Layer (Ethernet-APL) based end point field devices that can convey optical and radio frequency information.

BACKGROUND

Ethernet is a network communication standard defined in IEEE 802.3 that is widely used in local area networks (LAN), metropolitan area networks (MAN), wide area networks (WAN), and other networks. Ethernet-APL is an extension of the Ethernet standard to support more demanding industrial applications and is defined in IEEE 802.3cg. Among other things, Ethernet-APL provides high-speed communication over long distances, supplies both power and communication signals over a single twisted-pair cable, and implements protective measures that enable safe use of field devices and equipment in hazardous locations.

Hazardous locations for purposes herein are industrial locations that often operate under harsh environmental conditions, such as typically found in chemical processing plants, fuel storage tanks, certain manufacturing facilities, and the like. These facilities typically require extensive safety precautions to prevent accidental ignition of flammable material, such as mixtures of liquids, gases, and explosive substances, due to a spark from a mechanical and/or electrical contact. Ethernet-APL addresses many of these safety requirements by incorporating a number of techniques collectively referred to as Intrinsic Safety (IS) that help limit the possibility of ignition.

However, while a number of advances have been made in field devices and equipment, further improvements are continually needed.

SUMMARY

Embodiments of the present disclosure relate to systems and methods for providing improved field devices, particularly Ethernet-APL based end point field devices. In some embodiments, the systems and methods provide an Ethernet-APL based end point field device that allows optical and radio frequency signals to pass back and forth through its protective enclosure. In particular, the Ethernet-APL based end point field device herein is advantageously able to use visual status/configuration indicators as well as radio frequency modules that transmit and receive wireless communication during device operation. To this end, the Ethernet-APL based end point field device herein is provided with a protective enclosure that beneficially accommodates such visual status/configuration indicators and radio frequency modules. Such an arrangement allows operators to observe unaided the visual status/configuration indicators of the end point field device, and also allows radio frequency signals to pass through the enclosures with negligible or no attenuation.

In some embodiments, the protective enclosure of the disclosed field device is made of a transparent material that allows operators to see through the enclosure and observe the visual status/configuration indicators, and also allows radio frequency signals to pass through the enclosure with negligible or no attenuation. In some embodiments, the protective enclosure is made of an opaque material that nevertheless allows radio frequency signals to pass through with negligible or no attenuation. In the latter case, LEDs, light pipes and conduits, and similar light emitters may be mounted on the protective enclosure to allow operators to observe the status of the visual status/configuration indicators without requiring extensive safety precautions be taken to install the visual indicators.

In general, in one aspect, embodiments of the present disclosure relate to an Ethernet Advanced Physical Layer (Ethernet-APL) based end point field device. The Ethernet-APL based end point field device comprises, among other things, a protective enclosure having a bottom portion and a top portion removably secured to the bottom portion, at least one of the bottom portion and the top portion being made of an electrically non-conductive material. The Ethernet-APL based end point field device additionally comprises a circuit board having electronic components thereon mounted within the protective enclosure, the electronic components including Ethernet-APL compliant electronic components. The Ethernet-APL based end point field device further comprises one or more light emitters mounted on or in the protective enclosure, the one or more light emitters operable to emit light to indicate to an operator a current status or configuration for the end point field device.

In general, in another aspect, embodiments of the present disclosure relate to an Ethernet-APL based industrial system. The Ethernet-APL based industrial system comprises, among other things, an Ethernet-APL based network, an industrial control system connected to the Ethernet-APL based network. The Ethernet-APL based industrial system additionally comprises a plurality of Ethernet-APL based end point field devices connected to the Ethernet-APL based network and to the industrial control system, each device having a protective enclosure made of an electrically non-conductive material. The Ethernet-APL based industrial system further comprises one or more light emitters installed on or in the protective enclosure of at least one of the end point field devices, the one or more light emitters operable to emit light to indicate to an operator a current status or configuration for the end point field device.

In general, in still another aspect, embodiments of the present disclosure relate to a method of providing an Ethernet-APL based end point field device. The method comprises, among other things, providing a circuit board having electronic components thereon, the electronic components including Ethernet-APL compliant electronic components. The method additionally comprises enclosing the circuit board in a protective enclosure, the circuit board having a bottom portion and a top portion removably secured to the bottom portion, at least one of the bottom portion and the top portion being made of an electrically non-conductive material. The method further comprises installing one or more light emitters on or in the protective enclosure, the one or more light emitters operable to emit light to indicate to an operator a current status or configuration for the end point field device.

In accordance with any one or more of the foregoing embodiments, the at least one end point field device further comprises one or more labels applied at selected locations on the top portion of the enclosure, each label providing a visual status or configuration indicator for the end point field device.

In accordance with any one or more of the foregoing embodiments, the one or more light emitters for the at least one end point field device are installed at selected locations on the top portion of the enclosure, each light emitter located adjacent to a corresponding one of the one or more labels.

In accordance with any one or more of the foregoing embodiments, the one or more light emitters for the at least one end point field device are installed at selected locations on a circuit board mounted within the enclosure, each light emitter located on the circuit board directly underneath a corresponding one of the one or more labels.

In accordance with any one or more of the foregoing embodiments, at least the top portion of the enclosure for the at least one end point field device is made of a transparent material.

In accordance with any one or more of the foregoing embodiments, at least the bottom portion of the enclosure for the at least one end point field is made of an opaque material.

In accordance with any one or more of the foregoing embodiments, the at least one end point field device has one or more cable ports attached directly or indirectly to the enclosure thereof, at least one of the cable ports configured to connect to an Ethernet-APL based cable.

It is understood that the disclosed invention may be found suitable for use in numerous applications. The applications may include, for example, oil and gas, energy, food and beverage, water and wastewater, chemical, petrochemical, pharmaceutical, metal, and mining and mineral applications.

It is understood that there are many features, advantages and aspects associated with the disclosed invention, as will be appreciated from the discussions below and drawings.

BRIEF DESCRIPTION OF THE DRAWINGS

The foregoing features of the disclosure, as well as the disclosure itself may be more fully understood from the following detailed description of the drawings, in which.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

For convenience, certain introductory concepts and terms used in the specification are collected here.

As used herein, the term "edge" refers to Layer 0 of the Purdue Network Model for Industrial Control Systems.

As used herein, the term "field device" refers to intelligent field instruments with embedded control/compute/measurement capability implemented on lower power embedded microcontroller based platforms.

As used herein, the term "end point field device" refers to intelligent field instruments operating at the edge of a network that collect and communicate data (e.g., measurements, readings, movements, etc.) to the network.

As used herein, the term "machine learning (ML)" refers to the use and development of software that is able to learn and adapt without following explicit instructions, by using algorithms and statistical models to analyze and draw inferences from patterns in data.

As used herein, the term "embedded device" refers to a combination of a microcontroller, memory, and input/output peripherals—that has a dedicated function within a larger system.

As used herein, the term "networked" means connected via the Ethernet network communication standard.

As used herein, the term "high availability" refers to a device or application that can operate at a high level, continuously, without intervention, for a given time period. High-availability infrastructure is configured to deliver quality performance and handle different loads and failures with minimal or zero downtime.

As used herein, the term "Intrinsically Safe (IS)" refers to an approach to the design of equipment going into hazardous areas that reduces the available energy to a level where it is too low to cause ignition as certified by IEC TS 60079-39 or ATEX.

Figure 1:
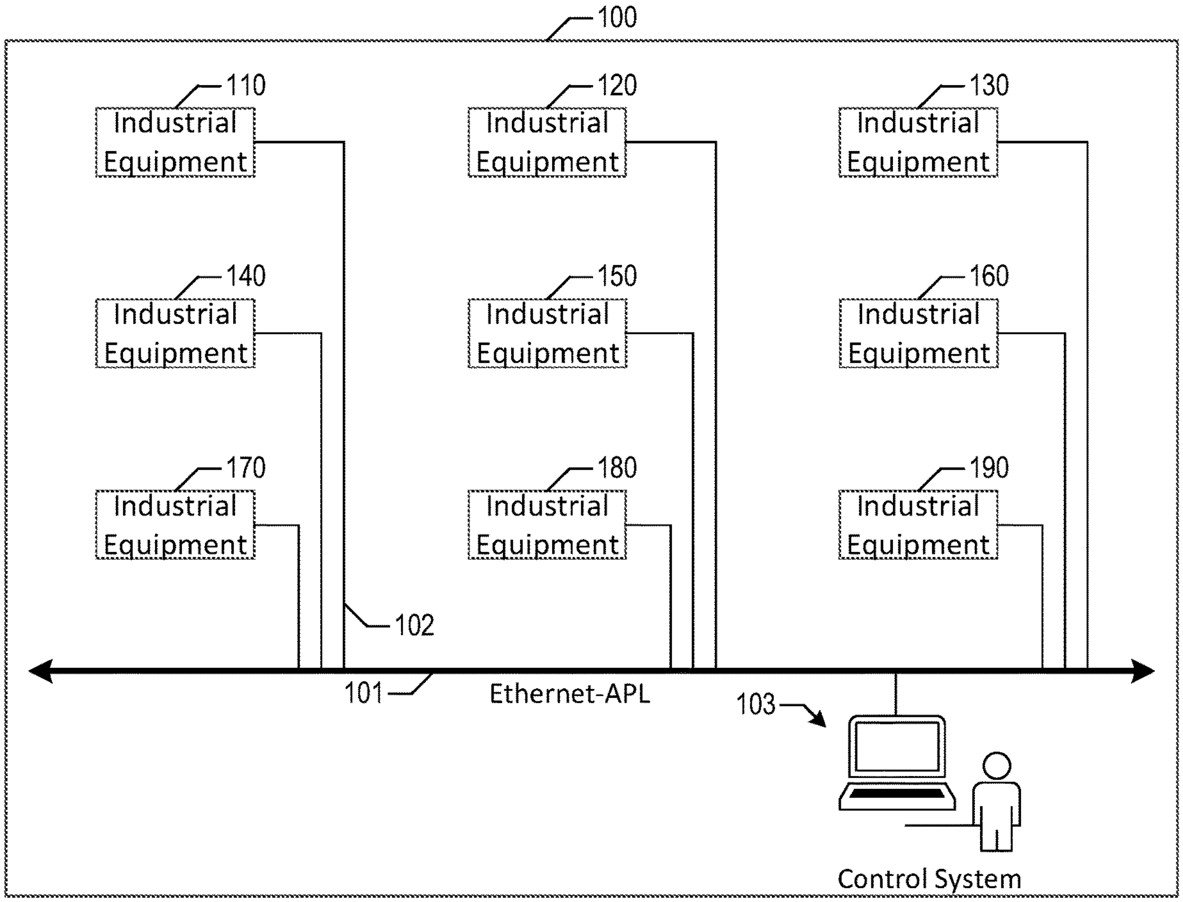
FIG. 1 shows an exemplary industrial location that uses Ethernet-APL based end point field devices in accordance with embodiments of the disclosure.

Referring to now FIG. 1, an industrial plant or operation 100 is shown that uses one or more Ethernet-APL based end point field devices in accordance with embodiments of the disclosure. The industrial operation 100 includes a plurality of industrial equipment connected or otherwise communicatively coupled to an Ethernet-APL based industrial network 101 via wired network connections, one of which is indicated at 102. The industrial equipment can come in a variety of forms and may be associated with various industrial processes, depending on the industrial operation. For example, the industrial operation 100 may include one or more end point field devices (e.g., RTUs, PLCs, actuators, sensors, HMIs, etc.) that are used to perform, analyze and/or control process variable measurements. These process variable measurements may include pressure, flow rate, fluid level, and temperature, for example. The industrial operation 100 and its associated equipment and process(es) may be operated and controlled over the Ethernet-APL based industrial network 101 by an industrial control system 103, such as a Distributed Control System (DCS), or a Supervisory Control and Data Acquisition (SCADA) system, and the like.

In the FIG. 1 example, the plurality of industrial equipment (which includes devices) are depicted at 110, 120, 130, 140, 150, 160, 170, 180, 190 and are capable of both wireless and wired communication. These industrial equipment 110-190 may be associated with a particular application (e.g., an industrial application), several different applications, and/or process(es). The industrial equipment 110-190 may include electrical or electronic equipment, for example, such as machinery associated with the industrial operation 100 (e.g., a manufacturing or natural resource extraction operation). The industrial equipment 110-190 may also include the controls and/or ancillary equipment associated with the industrial operation 100, for example, field devices (e.g., RTUs, PLCs, actuators, sensors, HMIs) that are used to perform, analyze and/or control process variable measurements. In embodiments, the industrial equipment 110-190 may be installed or located in one or more facilities (i.e., buildings) or other physical locations (i.e., sites) associated with the industrial operation 100. The facilities may correspond to industrial buildings or plants, for example, and/or they may correspond to geographical areas or locations, for example.

The industrial equipment 110-190 may each be configured to perform one or more tasks in some embodiments. For example, at least one of the industrial equipment 110-190 may be configured to produce or process one or more products, or a portion of a product, associated with the industrial operation 100. Additionally, at least one of the industrial equipment 110-190 may be configured to sense or monitor one or more parameters (e.g., industrial parameters) associated with the industrial operation 100. For example, industrial equipment 110 may include or be coupled to a temperature sensor configured to sense temperatures associated with the industrial equipment 110. The temperatures may include ambient temperature proximate to the industrial equipment 110, temperature of a process associated with the industrial equipment 110, temperature of a product produced by the industrial equipment 110, and the like. The industrial equipment 110 may additionally or alternatively include one or more pressure sensors, flow rate sensors, fluid level sensors, vibration sensors and/or any number of other sensors used by applications or processes associated with the industrial equipment 110. The applications or processes may involve water, air, gas, electricity, steam, oil, and the like in one example embodiment.

The industrial equipment 110-190 may take various forms and may each have an associated complexity (or set of functional capabilities and/or features). For example, industrial equipment 110 may correspond to a "basic" industrial equipment, industrial equipment 120 may correspond to an "intermediate" industrial equipment, and industrial equipment 130 may correspond to an "advanced" industrial equipment. In such embodiments, intermediate industrial equipment 120 may have more functionality (e.g., measurement features and/or capabilities) than basic industrial equipment 110, and advanced industrial equipment 130 may have more functionality and/or features than intermediate industrial equipment 120. For example, in embodiments industrial equipment 110 (e.g., industrial equipment with basic capabilities and/or features) may be capable of monitoring one or more first characteristics of an industrial process, and industrial equipment 130 (e.g., industrial equipment with advanced capabilities) may be capable of monitoring one or more second characteristics of the industrial process, with the second characteristics including the first characteristics and one or more additional parameters. It is understood that this example is for illustrative purposes only, and likewise in some embodiments the industrial equipment 110-190 may each have independent functionality.

As alluded to earlier, when certain industrial equipment, such as field devices, are installed in a hazardous location, various protective measures are typically employed to ensure that the devices do not inadvertently ignite flammable material during operation. In this regard, existing end point field devices have usually required protective enclosures that satisfy highly stringent safety certification requirements, which can render the devices prohibitively expensive and/or impractical to implement in some instances.

Embodiments of the present disclosure provide end point field devices that do not require the protective enclosures to satisfy the same stringent safety certification requirements as existing field devices for hazardous locations. This is because the end point field devices herein are Ethernet-APL based end point field devices, which means the devices comply electrically and mechanically with the Intrinsically Safe design requirements of Ethernet-APL. The Intrinsically Safe compliance allows the end point field devices herein to use materials for the protective enclosures that have more relaxed mechanical constraints compared to existing field devices. The compliance also permits LEDs, light pipes and conduits, and similar visual indicators to be installed on the protective enclosure without requiring the same stringent safety certification requirements as existing field devices.

Figure 2:
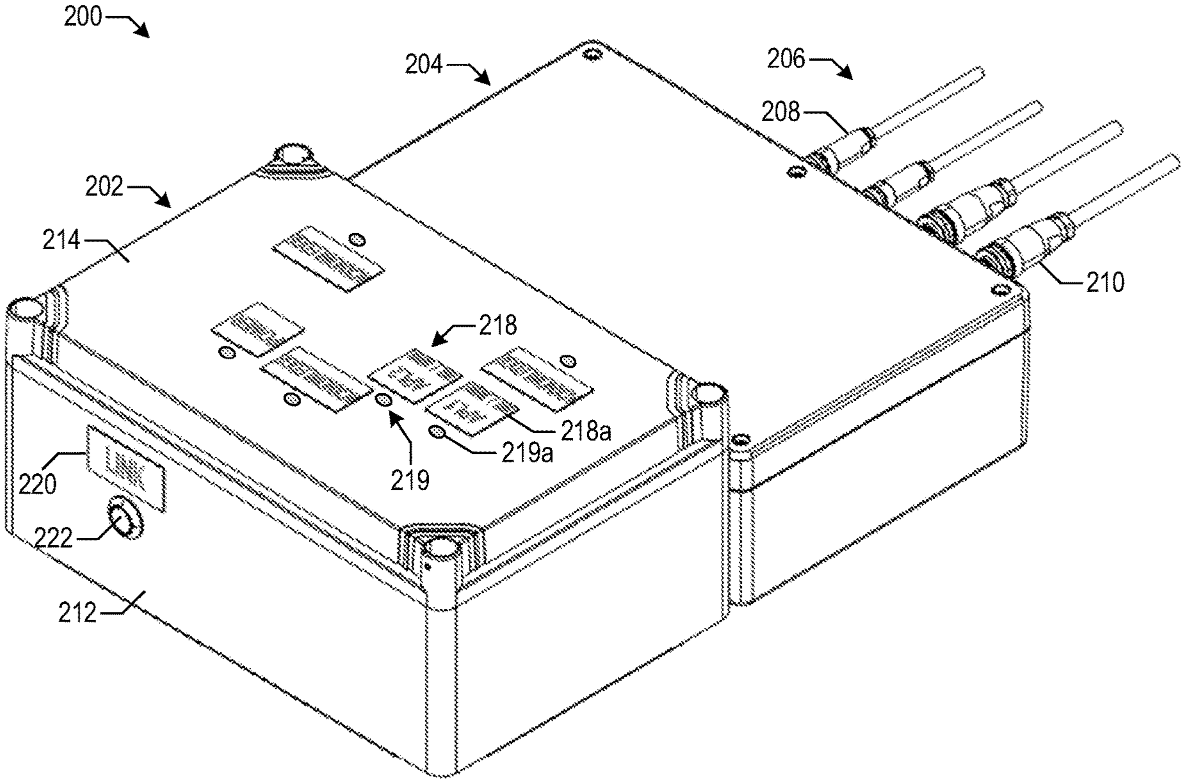
FIG. 2 shows an exemplary Ethernet-APL based end point field device in accordance with embodiments of the disclosure.

FIG. 2 shows an example of an Ethernet-APL based end point field device that may be used as, or in connection with, one of the industrial equipment 110-190 from FIG. 1 in accordance with embodiments of the disclosure. The example in FIG. 2 depicts the end point field device as part of an Ethernet-APL based industrial data collection unit 200 composed of an end point field device 202 attached to an Ethernet-APL junction box 204. The junction box 204, like other types of network junction boxes, serves mainly to house various wiring connections that allow one or more cables 206 to be connected to the end point field device 202. The cables 206 in turn allow the end point field device 202 to communicate with one or more industrial systems (e.g., DCS, SCADA, etc.) using a designated communication protocol. For example, the one or more cables 206 may include "M8" cables 208 for HART ("Highway Addressable Remote Transducer") based communication, "M12" cables 210 for APL based communication, and the like.

In the example shown, the end point field device 202 has a protective enclosure composed of a housing 212 configured (i.e., sized and shaped) to receive a cover 214 thereon. The housing 212 and cover 214 in this example are made an opaque material that nevertheless allows a radio frequency module in the end point field device 202 to transmit and receive radio frequency signals with negligible or no attenuation. Examples of suitable material that may be used for the housing 212 and cover 214 include various types of opaque plastics, translucent glass, ceramics, and certain electrically non-conductive metals known to those skilled in the art. The use of these materials for the protective enclosure allow the end point field device 202 to transmit and receive data and information wirelessly using radio frequency signals.

In some embodiments, the cover 214 may also have one or more visual status/configuration indicators thereon, generally indicated at 218, in the form of self-adhesive labels and other types of labels. For instance, there may be one or more APL link status indicator labels (e.g., "APL1 Link1/Status1," "APL2 Link2/Status2," etc.), an example of which is denoted at 218*a*, one or more "Acknowledgment" labels, a "Power" label, and the like, on an exterior (top) surface of the cover 214.

In addition, one or more light emitters, generally indicated at 219, may be installed or embedded in the cover 214 adjacent one of the visual status/configuration indicators 218 to indicate a current status/configuration for the end point field device 202. The one or more light emitters, one of which is denoted at 219*a*, may include LEDs, light pipes and conduits, and similar sources of light known in the art. Operation of these light emitters 219 is generally known and their installation is well understood by those having ordinary skill in the art. Such an arrangement allows operators to observe unaided a status/configuration for the end point field device 202, but without requiring extensive safety precautions around the light emitters 219.

In some embodiments, the housing 212 may also have one or more visual status/configuration indicators 218 thereon in the form of self-adhesive or other types of labels. For instance, there may be a "Link" label 220 on a side surface of the housing 212 for denoting a link button 222 located on the side of the housing 212. The link button 222 may be a pushbutton in some embodiments that an operator may manually actuate to initiate the process of communicatively coupling (i.e., linking) the end point field device 202 to an industrial system. In some embodiments, the link button 222 may incorporate a light source therein that illuminates the link button 222 in an appropriate color when a communication link has been established, and a different color (or flashing) if a link has not been established.

Figure 3:
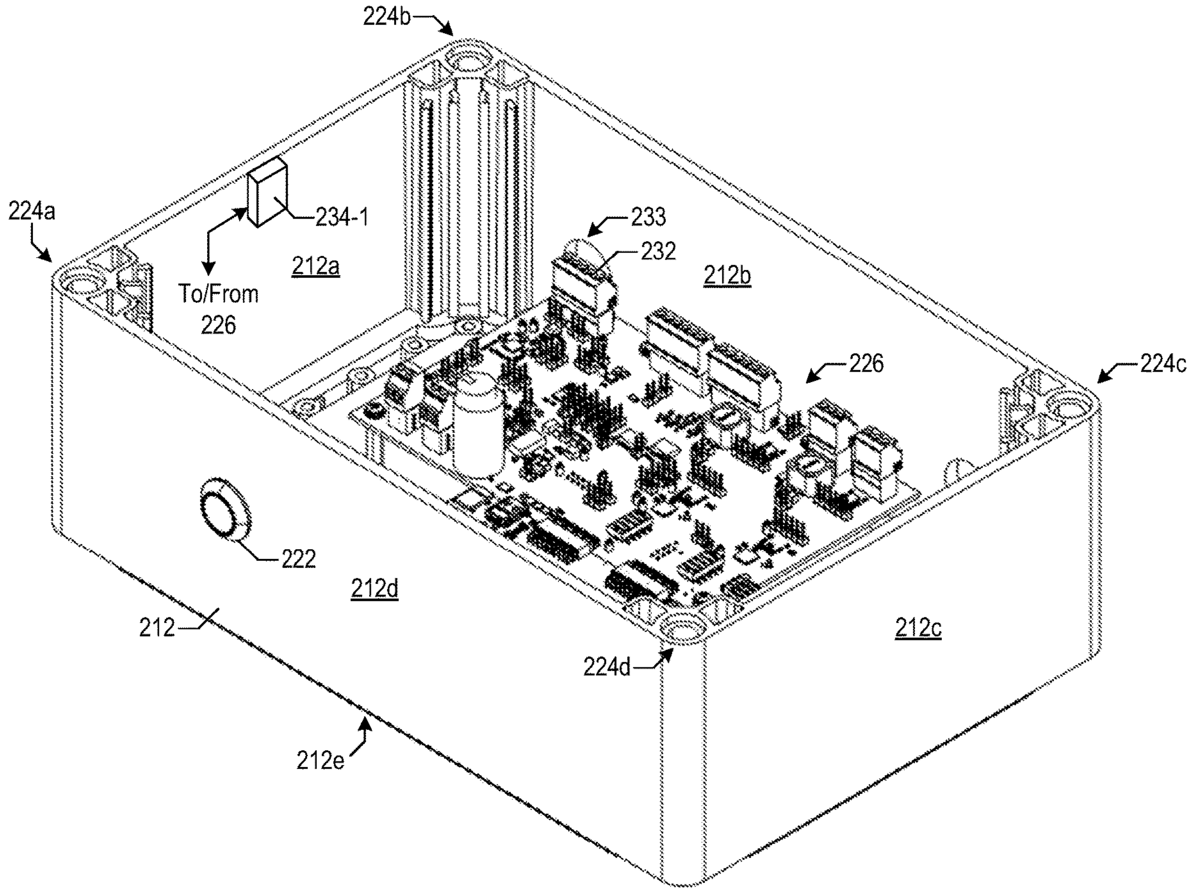
FIG. 3 shows an exemplary housing for the Ethernet-APL based end point field device in FIG. 2 in accordance with embodiments of the disclosure.

FIG. 3 shows the housing 212 for the protective enclosure from FIG. 2 without the cover 214 thereon in accordance with embodiments of the disclosure. As can be seen, the housing 212 has four sidewalls 212*a*, 212*b*, 212*c*, and 212*d* extending perpendicularly from a bottom wall 212*e* that together define a generally rectangular, open volume in this example. It will be appreciated that the housing 212 may assume alternative shapes (e.g., square, round, etc.) known to those skilled in the art within the scope of the present disclosure. A main circuit board 226 containing electronic components thereon for operation of the end point field device 202, including Ethernet-APL compliant components, may be mounted to the bottom wall 212*e* of the housing 212. The main circuit board 226 may be a printed wiring board (PWA), printed circuit board (PCP), or other types of circuit boards, and may include one or more terminal blocks, an example of which is indicated at 232. The terminal blocks 232 allow the main circuit board 226 to be wired to the junction box 204 via wires running through one or more wire apertures, one of which is indicated at 233, in the housing 212.

One or more boreholes 224*a*, 224*b*, 224*c*, and 224*d* may be formed at each corner of the housing 212 for securing the cover 214 to the housing 212 via an appropriate fastener (e.g., screws, bolts, etc.). The boreholes 224*a-d* may be configured (i.e., sized and shaped) in some embodiments to ensure that the housing 212 receives the cover 214 thereon in a properly aligned and close-fitting manner.

In some embodiments, a power and control coupling, one half of which is denoted at 234-1, may be attached to one of the sidewalls (e.g., sidewall 212*a*) of the housing 212. The other half of the power and control coupling may be mounted on the cover 214. Proper placement of the cover 214 on the housing 212 automatically connects the two halves of the power and control coupling to thereby provide power and control signals from the circuit board 226 to the light emitters 219.

Figure 4A:
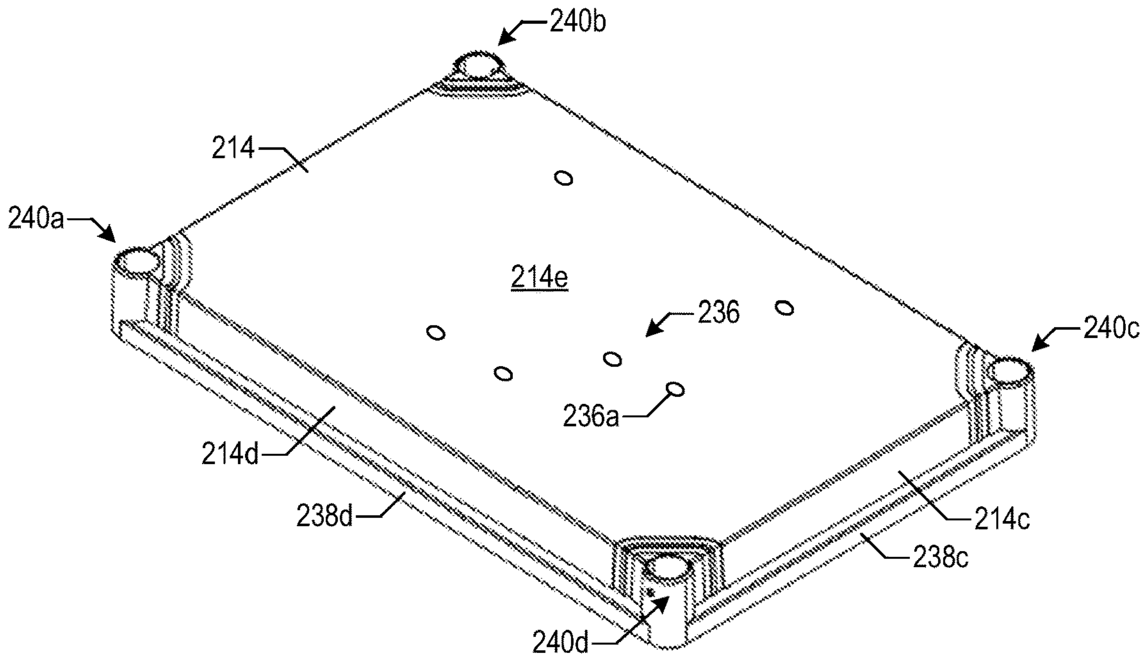
FIGS. 4A and 4B show an exemplary cover for the Ethernet-APL based end point field device in FIG. 2 in accordance with embodiments of the disclosure.
Figure 4B:
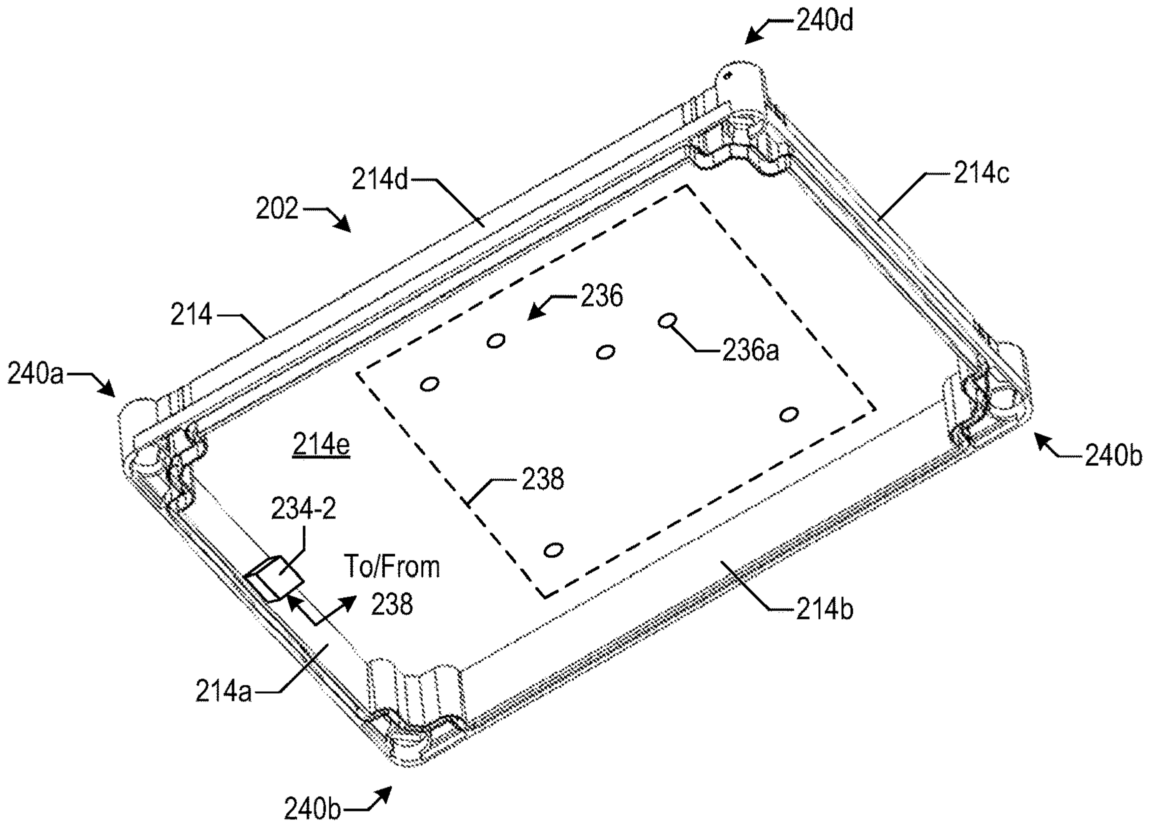

FIGS. 4A and 4B show top and bottom views, respectively, of the cover 214 for the protective enclosure from FIG. 2 without the housing 212 in accordance with embodiments of the disclosure. As these views show, the cover 214 has four sidewalls 214*a*, 214*b*, 214*c*, and 214*d* extending perpendicularly from a top wall 214*e* that together define a generally rectangular lid in this example. One or more light apertures, generally indicated at 236, may be formed in the top wall 214*e* of the cover 214 for receiving the one or more light emitters 219 mentioned earlier (see FIG. 2). Each light aperture, one of which is denoted at 219*a*, may be appropriately sized and shaped to receive a corresponding light emitter therein, such as an LED, light pipe and conduit, and similar sources of light known in the art. In some embodiments, a ledge 238*a*, 238*b*, 238*c*, 238*d*, may be provided, respectively, along a bottom edge of the four sidewalls 214*a*, 214*b*, 214*c*, and 214*d*. One or more boreholes 240*a*, 240*b*, 240*c*, and 240*d* may be formed at each corner of the cover 214 for securing the cover 214 to the housing 212 via an appropriate fastener (e.g., screws, bolts, etc.). The boreholes 240*a-d* may be configured (i.e., sized and shaped) in some embodiments to ensure that the cover 214 is received in the housing 212 in a proper and close-fitting manner.

As specifically shown in FIG. 4B, in some embodiments, the light emitters 219 may be installed or embedded in the cover 214 as a part of a circuit board 238, shown here in dashed lines, that is mounted to the underside of the top wall 214*e*. Power and control signals for the circuit board 238 may be provided via the power and control coupling mentioned above, the other half of which is designated at 234-2.

Figure 5:
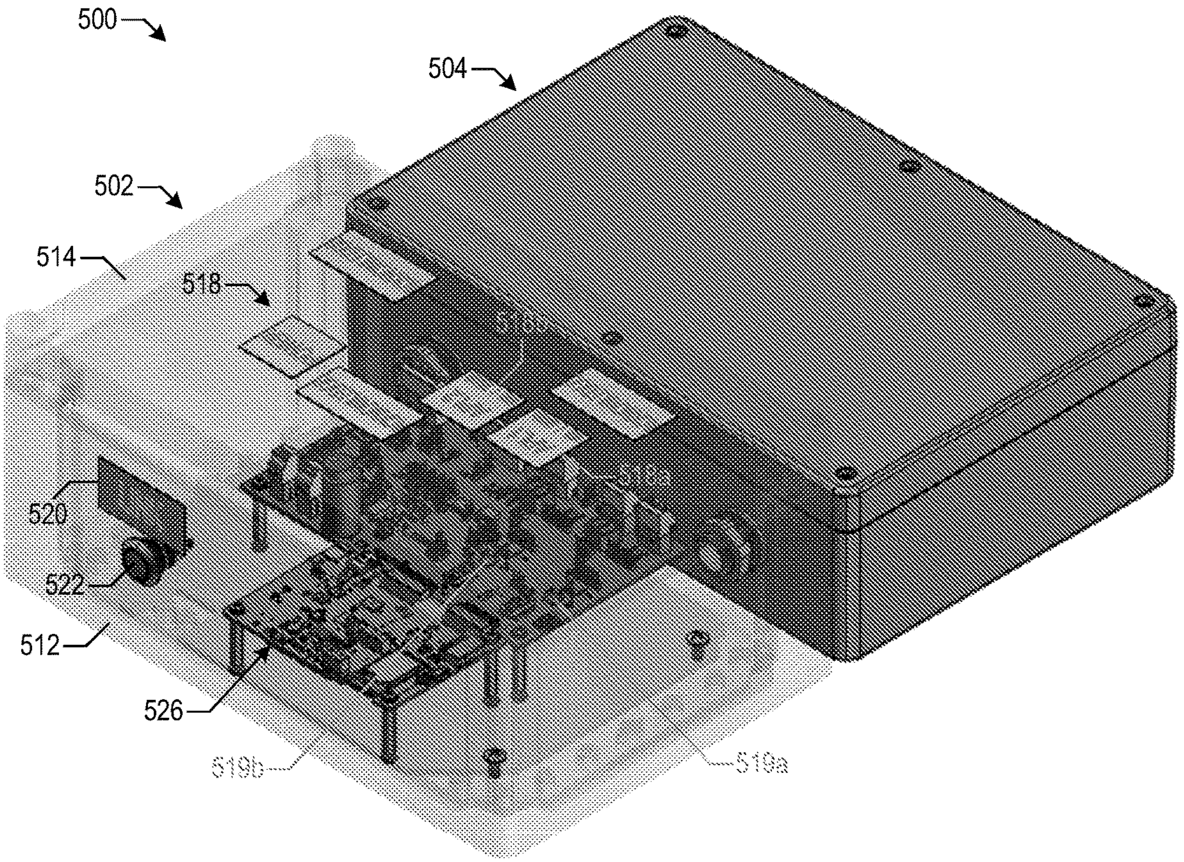
FIG. 5 shows an exemplary Ethernet-APL based end point field device similar to the device in FIG. 2 having a transparent enclosure.

FIG. 5 shows an example of an Ethernet-APL based industrial data collection unit 500 that is similar to the Ethernet-APL based industrial data collection unit 200 from FIG. 2. The example in FIG. 5 depicts the industrial data collection unit 500 also being composed of an end point field device 502 attached to an Ethernet-APL junction box 504. The end point field device 502 is nearly identical to its counterpart from FIG. 2 insofar as there is a protective enclosure composed of a housing 512 configured (i.e., sized and shaped) to receive a cover 514 thereon. However, both the housing 512 and the cover 514 in this example are made of a solid see-through (i.e., transparent, clear) material that allows optical as well as radio frequency signals from a radio frequency module of the end point field device 502 to pass through with negligible or no diffraction or attenuation. Examples of suitable material that may be used for the housing 512 and cover 514 include various types of transparent plastics, clear glass, and other see-through material known to those skilled in the art. This allows operators to see unaided into the end point field device 500, and also allows radio frequency signals to pass through the enclosure with negligible or no attenuation.

As before, the cover 514 may also have one or more visual status/configuration indicators thereon, generally indicated at 518, in the form of self-adhesive labels and other types of labels. For instance, there may be one or more APL link status indicator labels (e.g., "APL1 Link1/Status1," "APL2 Link2/Status2," etc.), examples of which are denoted at 518*a* and 518*b*, one or more "Acknowledgment" labels, a "Power" label, and the like, on an exterior (top) surface of the cover 514. However, because the cover 514 is made of a transparent material, no light emitters need to be installed or embedded in the cover 514 of the end point field device 502. Instead, one or more light emitters, two of which are denoted at 519*a* and 519*b*, may be mounted directly on a printed wiring board (PWA) or other circuit board 526 of the end point field device 502. The one or more light emitters may be positioned directly underneath a corresponding visual status/configuration indicator 518 to indicate a current status/configuration for the end point field device 502. Operators may then determine a status/configuration of the end point field device 502 by simply peering into the device.

As for the housing 512, in some embodiments, the housing 512 may be identical to its counterpart in FIG. 2, including a "Link" label 520 and link button 522, but is made of a solid see-through material rather than an opaque material. Indeed, in some embodiments, the housing 512 can be made of an opaque material while the cover 514 is made of a transparent material within the scope of the present disclosure. The junction box 504 here serves mainly to house various wiring connections that allow the end point field device 502 to communicate with one or more industrial systems (e.g., DCS, SCADA, etc.) and, in this regard, is also identical to its counterpart in FIG. 2.

Figure 6:
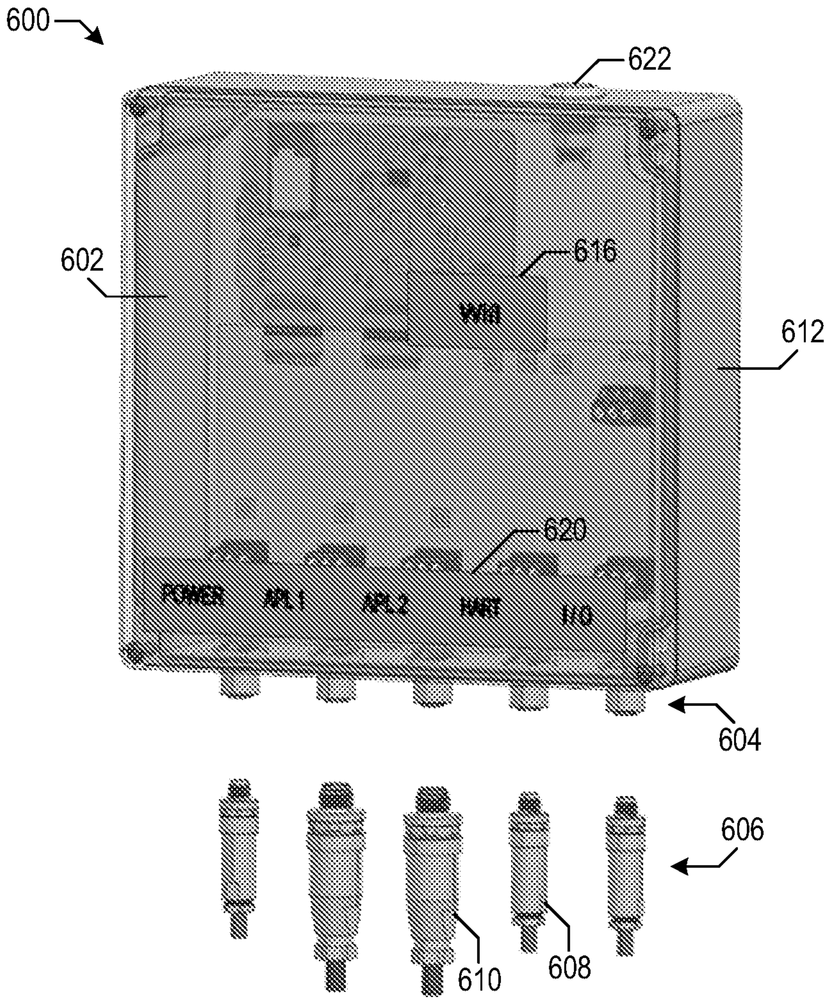
FIG. 6 shows an alternative Ethernet-APL based end point field device in accordance with embodiments of the disclosure.

Turning now to FIG. 6, another example of an Ethernet-APL based end point field device is shown that may be used as, or in connection with, one of the industrial equipment 110-190 from FIG. 1. The example in FIG. 6 depicts an end point field device 600 in which the wiring connections needed to communicate with the one or more industrial systems (e.g., DCS, SCADA, etc.) are included with the end point field device 600. To this end, one or more cable ports 604 are provided in the end point field device 600 to receive one or more cables 606, including APL cables and other types of cables, that may be connected to the end point field device 600. The cables 606 in turn allow the end point field device 600 to communicate with the one or more industrial systems using a designated communication protocol. Examples of the one or more cables 606 may include M8 cables 608 for HART based communication, M12 cables 610 for APL based communication, and the like.

As FIG. 6 shows, the end point field device 600 has a protective enclosure composed of a housing 612 configured (i.e., sized and shaped) to receive a cover 602 thereon. The housing 612 in this example is made an opaque material while the cover 602 is made of a transparent material. As before, the transparent material allows optical as well as radio frequency signals from a radio frequency module of the end point field device 600 to pass through with negligible or no diffraction or attenuation. Materials that may be used for the housing 612 and the cover 602, respectively, include the same known opaque and transparent materials discussed previously, respectively. In some embodiments, the cover 602 may have one or more visual status/configuration indicators thereon in the form of self-adhesive labels and other types of labels. For instance, there may be Wi-Fi status indicator label 616 on the cover 602, as well as a multi-indicator label 620 containing multiple status indicators, such as Power, APL1, APL2, HART, I/O, and the like.

Figure 7:
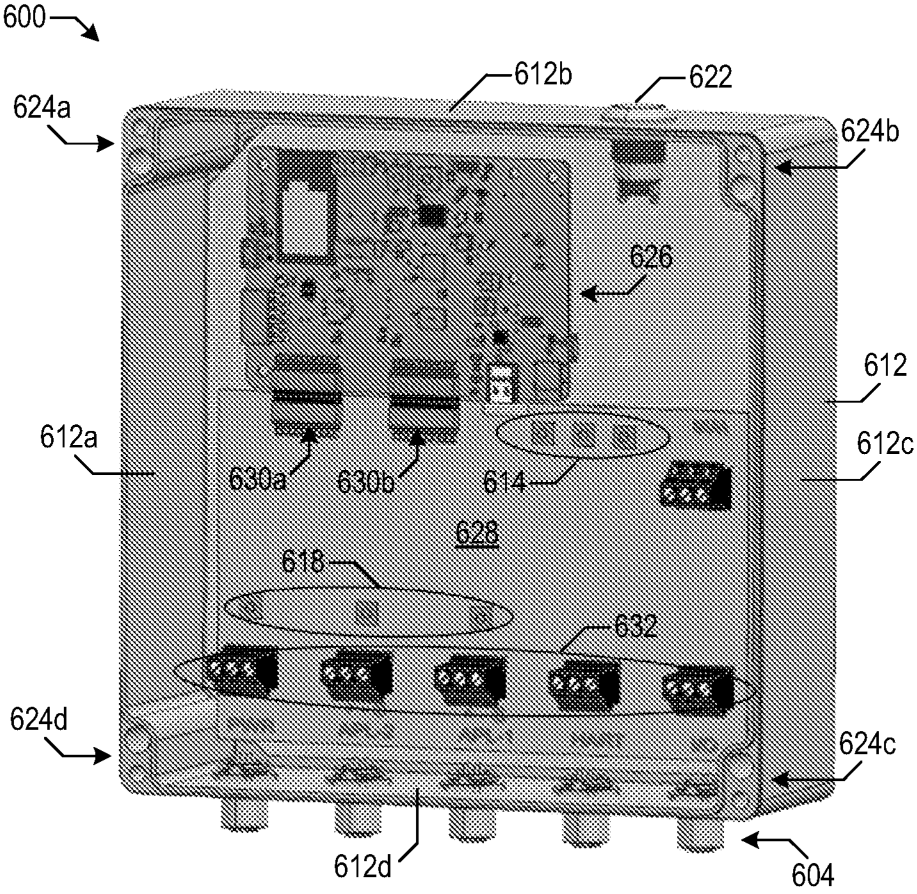
FIG. 7 shows an exemplary housing for the Ethernet-APL based end point field device in FIG. 6 in accordance with embodiments of the disclosure.

FIG. 7 shows the housing 612 for the protective enclosure from FIG. 6 without the cover 602 thereon in accordance with embodiments of the disclosure. As can be seen, the housing 612 has four sidewalls 612*a*, 612*b*, 612*c*, and 612*d* extending perpendicularly from a bottom wall (not labeled) that together define a generally rectangular, open volume in this example. One or more boreholes 624*a*, 624*b*, 624*c*, and 624*d* may be formed at each corner of the housing 612 for securing the cover 602 to the housing 612 via an appropriate fastener (e.g., screws, bolts, etc.). The boreholes 624*a-d* may be configured (i.e., sized and shaped) in some embodiments to ensure that the housing 612 receives the cover 614 thereon in a properly aligned and close-fitting manner. It will be appreciated that the housing 612, like its counterpart in FIG. 3, may assume alternative shapes (e.g., square, round, etc.) known to those skilled in the art within the scope of the present disclosure.

A main circuit board 626 containing electronic components thereon for operation of the end point field device 600, including Ethernet-APL compliant components, may be mounted to the bottom wall of the housing 612. The main circuit board 626 may be a PWA, PCP, or other types of circuit boards. A junction circuit board 628 may also be mounted to the bottom wall of the housing 612 adjacent to the main circuit board 626. The junction circuit board 628 may be communicatively coupled to the main circuit board 626 via one or more board-to-board connectors 630*a* and 630*b* in a known manner to receive power from and exchange control signals with the main circuit board 626.

One or more Wi-Fi status light emitters 614 may be provided on the junction circuit board 628 and positioned so as to be underneath the Wi-Fi status label 616 to provide a current status of any Wi-Fi connections. Similarly, one or more multi-status light emitters 618 may be provided on the junction circuit board 628 and positioned underneath the multi-indicator label 620 for indicating a current status of one or more indicators on that label. It is of course possible to locate the Wi-Fi status light emitters 614 and/or the multi-status light emitters 618 on the main circuit board 626 instead of the junction circuit board 628 in some embodiments.

A number of screw terminals, generally indicated at 632 may also be provided on the junction circuit board 628, each screw terminal 632 corresponding to one of the cable ports 604. The screw terminals 632 provide wiring connections for the cable ports 604 to allow the cables 606 discussed above to be communicatively coupled to the end point field device 600.

Figure 8:
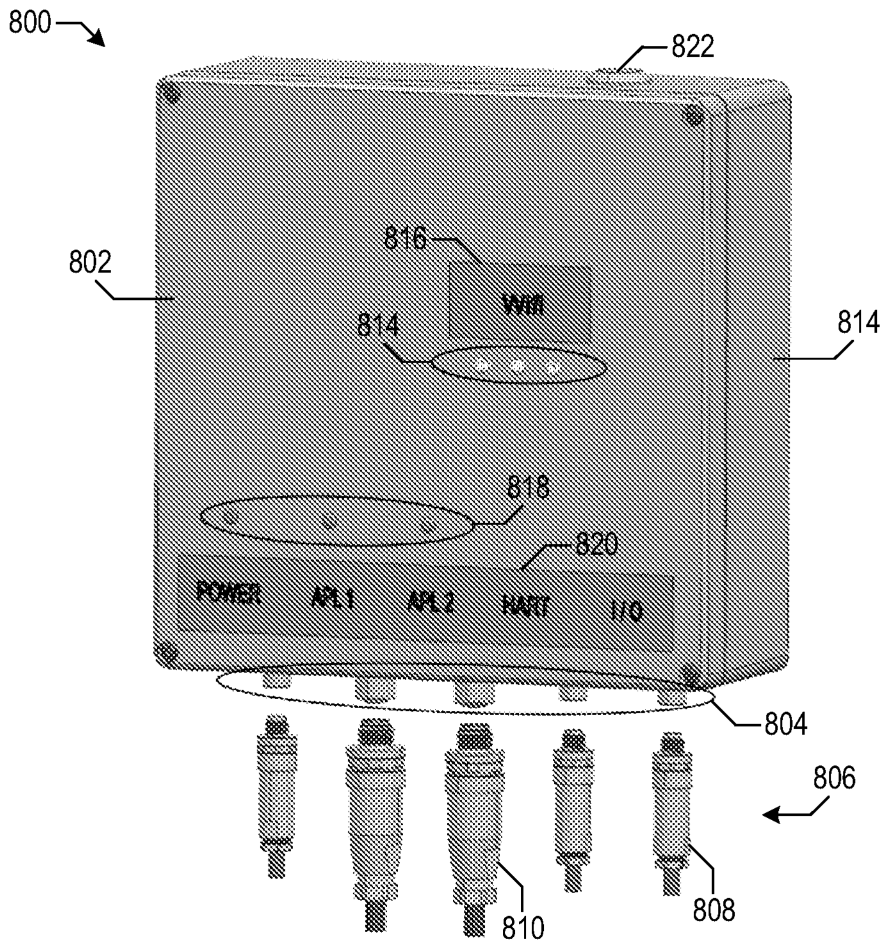
FIG. 8 shows an exemplary Ethernet-APL based end point field device similar to the device in FIG. 6 having an opaque cover in accordance with embodiments of the disclosure.

FIG. 8 shows another example of an Ethernet-APL based end point field device that that may be used as, or in connection with, one of the industrial equipment 110-190 from FIG. 1. The example in FIG. 8 depicts an end point field device 800 that is otherwise the same as the end point field device 600 from FIGS. 6 and 7 insofar as the wiring connections needed to communicate with the one or more industrial systems (e.g., DCS, SCADA, etc.) are included with the end point field device 800. Thus, there are one or more cable ports 804 in the end point field device 800 designed to receive one or more cables 806, including APL cables and other types of cables, that may be connected to the end point field device 800. The cables 806 in turn allow the end point field device 800 to communicate with the one or more industrial systems using a designated communication protocol. Examples of the one or more cables 806 may include M8 cables 808 for HART based communication, M12 cables 810 for APL based communication, and the like.

Like the end point field device 600 above, the end point field device 800 here has a protective enclosure composed of a housing 812 configured to receive a cover 802 thereon. However, both the housing 812 and the cover 802 in this example are made an opaque material. As a result, the cover 802 is provided with not only a Wi-Fi status indicator label 816 and a multi-indicator label 820 (e.g., Power, APL1, APL2, HART, I/O, etc.), but also Wi-Fi status light emitters 814 and multi-status light emitters 818 thereon corresponding to the labels 816 and 820, as operators will not be able to see into the end point field device 800 during operation. Power and control signals for the light emitters 814 and 818 may be provided in a similar manner as discussed with respect to the end point field device 202 (see FIGS. 3 and 4A-4B).

Figure 9:
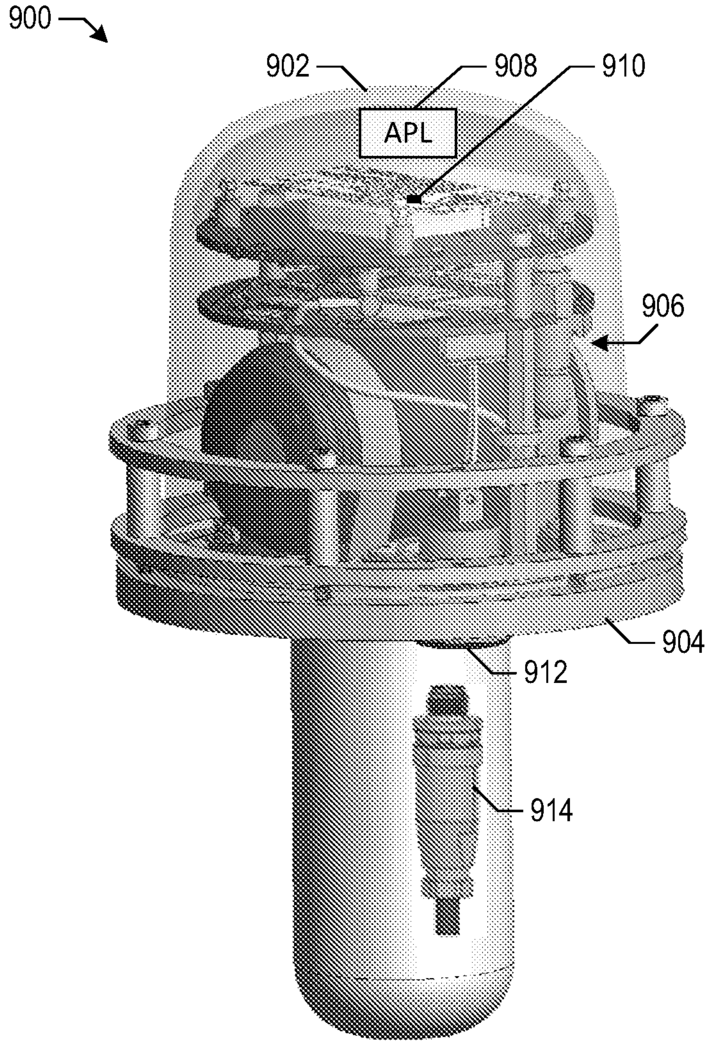
FIG. 9 shows yet another exemplary Ethernet-APL based end point field device in accordance with embodiments of the disclosure.

Referring now to FIG. 9, yet another example of an Ethernet-APL based end point field device is shown that that may be used as, or in connection with, one of the industrial equipment 110-190 from FIG. 1. The example in FIG. 9 depicts an end point field device 900 that is equipped to send and receive data via wireless as well as wired transmissions. For the latter, the wiring connections used to connect the endpoint field device 900 to one or more industrial systems (e.g., DCS, SCADA, etc.) are included within the end point field device 900. Thus, a separate junction box and related wiring components are not needed. In some embodiments, activation and control of the end point field device 900 may be accomplished remotely via the wireless and/or wired transmissions.

In the example of FIG. 9, the end point field device 900 has a protective enclosure composed of a dome-shaped cover 902 that is attached to a base plate 904. The dome-shaped cover 902 is preferably made of a transparent material while the base plate 904 may be made of any suitable material, including various metals and metal alloys (e.g., stainless steel). Other suitable shapes and materials may of course be used for the cover 902 and the base plate 904 depending on the particular application. As discussed above, the transparent material allows optical as well as radio frequency signals from a radio frequency module of the end point field device 900 to pass through with negligible or no diffraction or attenuation.

One or more circuit boards 906 containing electronic components thereon for operation of the end point field device 900, including Ethernet-APL compliant components, may be housed within the dome-shaped cover 902 and the base plate 904 for operation of the end point field device 900. Operation of the end point field device 900 may be observed and monitored with the aid of one or more visual status/configuration indicators, such as an APL status indicator label 908, provided on the cover 902 for indicating a current status of the end point field device 900. One or more status light emitters, such as an APL status light emitter 910, may be provided on the one or more circuit boards 906 underneath APL status indicator 908 to allow an operator to view unaided the current status of the end point field device 900 through the cover 902. One or more cable ports, an example of which is denoted at 912, may be provided in the base plate 904 for receiving one or more cables 914, such as an APL cable and other types of cables, that may be connected to the end point field device 900. The cables 914 in turn allow the end point field device 900 to communicate with the one or more industrial systems using a designated communication protocol, such as for HART based communication protocol or an APL based communication protocol, and the like.

Figure 10:
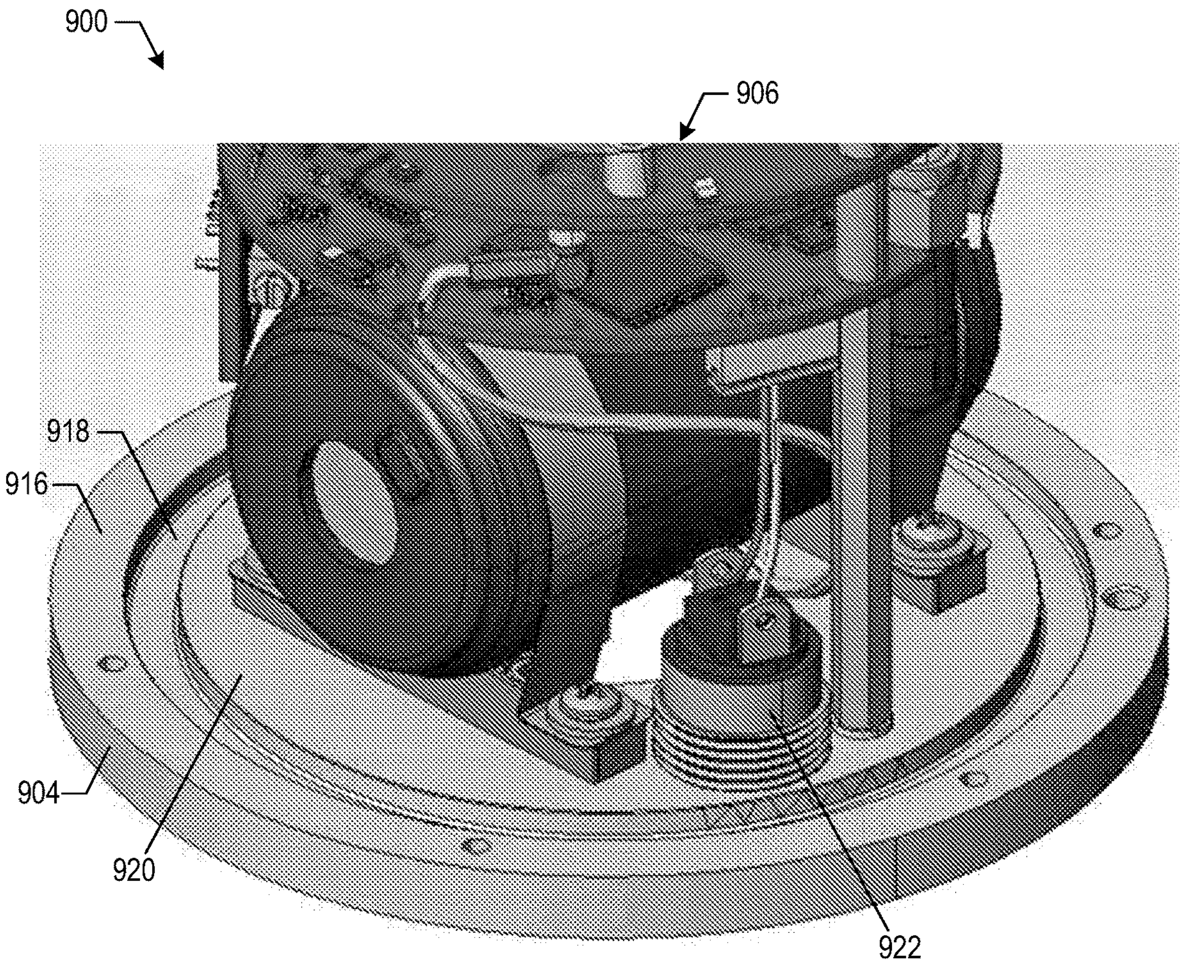
FIG. 10 shows additional details of the Ethernet-APL based end point field device in FIG. 9 in accordance with embodiments of the disclosure.

FIG. 10 shows a partial view of the exemplary the end point field device 900 from FIG. 9 with the cover 902 removed from the base plate 904. As this figure shows, the base plate 904 has a circumferential flange portion 916 to which the cover 902 may be fastened (e.g., via screws, bolts, etc.) to enclose the circuit boards and electronics 906 within the end point field device 900. The flange portion 916 surrounds a circular recessed area 918 that defines a circular raised mounting platform 920 on which the circuit boards and electronics 906 may be mounted. In some embodiments, an O-ring or similar sealing device may be disposed within the recessed area 918 adjacent the flange 916 to provide a liquid and gas tight seal when the cover 902 is fastened. One or more port connectors for the one or more cable ports 912, such as an APL port connector or other types of port connectors, may also be mounted on the raised mounting platform 920 for receiving the one or more cables 914. An example of the port connectors is denoted at 922.

Figure 11:
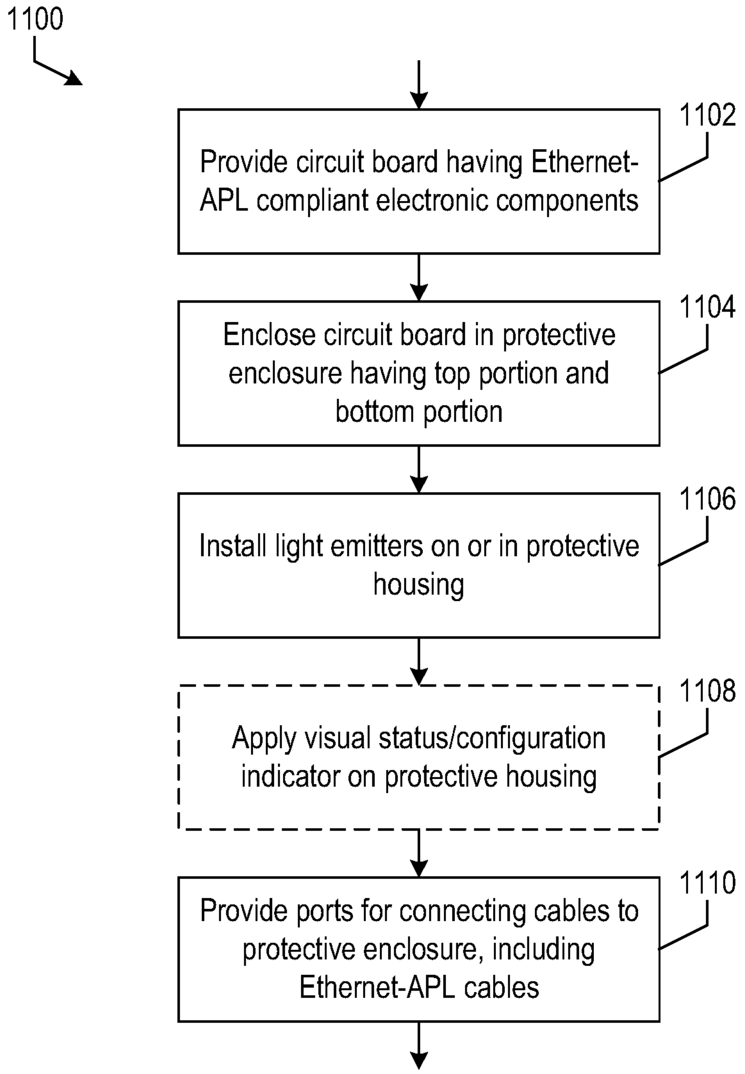
FIG. 11 shows an exemplary flowchart for a method that may be used with an Ethernet-APL based end point field device in accordance with embodiments of the disclosure.

Turning now to FIG. 11, an exemplary flowchart is shown representing a method 1100 that may be used by, or in conjunction with, and Ethernet APL based end point field device in accordance with embodiments of the present disclosure. Although the method 1100 is illustrated as a series of discrete blocks, it will be appreciated that an individual block may be divided into several sub-blocks, and any two or more blocks may be combined into a super-block within the scope of the present disclosure. In addition, although the blocks of the method 1100 are depicted in a particular sequence, it is possible to take one or more of the blocks out of the sequence shown, or remove the one or more blocks from the sequence, within the scope of the present disclosure The method 1100 generally begins at block 1102 where a circuit board is provided or obtained having a various electronic components thereon. The electronic components include components that are Ethernet-APL compliant, meaning that the components follow the Ethernet APL standard where applicable. Indeed, the circuit board as a whole follows the Ethernet-APL standard, meaning that it was designed using the Intrinsically Safe design techniques mentioned above. In any event, the electronic components operate in a manner known to those skilled in the art to enable various functionality needed by the end point field device, as described above with respect to FIG. 1.

At block 1104, the circuit board is enclosed within a protective enclosure having a bottom portion and a top portion that can be removably secured to the bottom portion. In some embodiments, the bottom portion is a housing and the top portion is a cover for the housing that resembles a lid. In some embodiments, the bottom portion may be a base plate and the top portion may be a dome that fits over the base plate. Preferably both the top and bottom portions are made of an electrically nonconductive material to allow transmission of radio frequency signals, but it is possible for just the top portion to be made of an electrically nonconductive material in some embodiments. In some embodiments, the electrically nonconductive material may be a solid see-through material, such as transparent plastic, clear glass, and the like.

At block 1106, one or more light emitters may be installed on the protective housing at selected locations. Alternatively, the light emitters may be installed on the circuit board at selected locations. In either case, the light emitters provide an indication of the current status or configuration of various operational aspects of the end point field device, such as whether an APL link has been established, whether power is being supplied, whether a Wi-Fi connection has been made, and so forth. Examples of light emitters may include LEDs, light pipes or conduits, as well as other light sources.

At block 1108, optionally, one or more visual status/configuration indicators are applied at selected locations on the protective housing. These indicators may be in the form of self-adhesive labels or other types of labels applied to the top portion of the protective enclosure. The visual indicators may be located adjacent to their respective light emitters when the light emitters are installed in the top portion of the enclosure, or they may be located directly above the light emitters when the light emitters are installed on the circuit board. In either case, the visual indicators complement the one or more light emitters by indicating which status/configuration of the end point field device is associated with which light emitter.

At block 1110, one or more cable ports are provided for the end point field device. The cable ports are designed to receive or otherwise connect to one or more cables, including APL cables, HART cables, and other types of cables that use other communication protocols. In some embodiments, the cable ports may be provided on the protective enclosure itself, for example, on the bottom portion thereof, thereby allowing the one or more cables to be connected directly to the end point field device. In some embodiments, the cable ports may be provided on a junction box attached to the protective enclosure that contains wiring connections which allow the one or more cables to be indirectly connected to the end point field device.

Thus far, a number of features and advantages of embodiments of the present disclosure have been shown and described. Other possible features and advantages associated with the disclosed embodiments will be appreciated by one of ordinary skill in the art. For example, while various visual status/configuration indicators (labels) have been shown and described, it should be understood that the use of such visual status/configuration indicators (labels) is optional and not strictly necessary. It should also be understood that embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in the example applications described herein (e.g., industrial applications), but rather may be useful in substantially any application where it is desired to monitor, whether visually or remotely, the status/configuration of a device or equipment. While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above. Accordingly, it is submitted that that scope of the patent should not be limited to the described embodiments but rather should be limited only by the spirit and scope of the following claims.

What is claimed is:

1. An Ethernet Advanced Physical Layer (Ethernet-APL) based end point field device, comprising:

a protective enclosure having a bottom portion and a top portion removably secured to the bottom portion, at least one of the bottom portion and the top portion being made of an electrically non-conductive material;

a circuit board having electronic components thereon mounted within the protective enclosure, the electronic components including Ethernet-APL compliant electronic components; and one or more light emitters mounted on or in the protective enclosure, the one or more light emitters operable to emit light to indicate to an operator a current status or configuration for the end point field device.

2. The Ethernet-APL based end point field device of claim 1, further comprising one or more labels applied at selected locations on the top portion of the enclosure, each label providing a visual status or configuration indicator for the end point field device.

3. The Ethernet-APL based end point field device of claim 2, wherein the one or more light emitters are installed at selected locations on the top portion of the enclosure, each light emitter located adjacent to a corresponding one of the one or more labels.

4. The Ethernet-APL based end point field device of claim 2, wherein the one or more light emitters are located at selected locations on the circuit board, each light emitter located on the circuit board directly underneath a corresponding one of the one or more labels.

5. The Ethernet-APL based end point field device of claim 1, wherein at least the top portion of the enclosure is made of a transparent material.

6. The Ethernet-APL based end point field device of claim 1, wherein at least the bottom portion of the enclosure is made of an opaque material.

7. The Ethernet-APL based end point field device of claim 1, further comprising one or more cable ports attached directly or indirectly to the enclosure, at least one of the cable ports configured to connect to an Ethernet-APL based cable.

8. An Ethernet Advanced Physical Layer (Ethernet-APL) based industrial system, comprising:

an Ethernet-APL based network;

an industrial control system connected to the Ethernet-APL based network;

a plurality of Ethernet-APL based end point field devices connected to the Ethernet-APL based network and to the industrial control system, each device having a protective enclosure made of an electrically non-conductive material; and one or more light emitters installed on or in the protective enclosure of at least one of the end point field devices, the one or more light emitters operable to emit light to indicate to an operator a current status or configuration for the end point field device.

9. The Ethernet-APL based industrial system of claim 8, wherein the protective enclosure for at least one end point field device includes a bottom portion and a top portion removably secured to the bottom portion, and wherein at least one of the bottom portion and the top portion is made of the electrically non-conductive material.

10. The Ethernet-APL based industrial system of claim 9, wherein the at least one end point field device further comprises one or more labels applied at selected locations on the top portion of the enclosure, each label providing a visual status or configuration indicator for the end point field device.

11. The Ethernet-APL based industrial system of claim 10, wherein the one or more light emitters for the at least one end point field device are installed at selected locations on the top portion of the enclosure, each light emitter located adjacent to a corresponding one of the one or more labels.

12. The Ethernet-APL based industrial system of claim 10, wherein the one or more light emitters for the at least one end point field device are installed at selected locations on a circuit board mounted within the enclosure, each light emitter located on the circuit board directly underneath a corresponding one of the one or more labels.

13. The Ethernet-APL based industrial system of claim 10, wherein at least the top portion of the enclosure for the at least one end point field device is made of a transparent material.

14. The Ethernet-APL based industrial system of claim 10, wherein at least the bottom portion of the enclosure for the at least one end point field device is made of an opaque material.

15. The Ethernet-APL based industrial system of claim 8, wherein the at least one end point field device has one or more cable ports attached directly or indirectly to the enclosure thereof, at least one of the cable ports configured to connect to an Ethernet-APL based cable.

16. A method of providing an Ethernet Advanced Physical Layer (Ethernet-APL) based end point field device, the method comprising:

providing a circuit board having electronic components thereon, the electronic components including Ethernet-APL compliant electronic components;

enclosing the circuit board in a protective enclosure, the protective enclosure having a bottom portion and a top portion removably secured to the bottom portion, at least one of the bottom portion and the top portion being made of an electrically non-conductive material; and installing one or more light emitters on or in the protective enclosure, the one or more light emitters operable to emit light to indicate to an operator a current status or configuration for the end point field device.

17. The method of claim 16, further comprising applying one or more labels at selected locations on the top portion of the enclosure, each label providing a visual status or configuration indicator for the end point field device.

18. The method of claim 17, further comprising installing the one or more light emitters at selected locations on the top portion of the enclosure, each light emitter located adjacent to a corresponding one of the one or more labels.

19. The method of claim 17, further comprising installing the one or more light emitters at selected locations on the circuit board, each light emitter located on the circuit board directly underneath a corresponding one of the one or more labels.

20. The method of claim 16, wherein at least the top portion of the enclosure is made of a transparent material.

21. The method of claim 16, wherein at least the bottom portion of the enclosure is made of an opaque material.

22. The method of claim 16, further comprising providing one or more cable ports for the Ethernet-APL based end point field device, at least one of the cable ports configured to connect to an Ethernet-APL based cable.

* * * * *